United States Patent
Strogov et al.

(10) Patent No.: US 12,287,866 B2
(45) Date of Patent: Apr. 29, 2025

(54) SYSTEM AND METHOD FOR THREAT DETECTION BASED ON STACK TRACE AND USER-MODE SENSORS

(71) Applicant: Acronis International GmbH, Schaffhausen (CH)

(72) Inventors: Vladimir Strogov, Singapore (SG); Sergey Ulasen, Singapore (SG); Aliaksei Dodz, Singapore (SG); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 132 days.

(21) Appl. No.: 18/192,870

(22) Filed: Mar. 30, 2023

(65) Prior Publication Data
US 2024/0330434 A1 Oct. 3, 2024

(51) Int. Cl.
G06F 21/52 (2013.01)
G06F 21/55 (2013.01)
G06F 21/56 (2013.01)

(52) U.S. Cl.
CPC ............ *G06F 21/52* (2013.01); *G06F 21/566* (2013.01); *G06F 2221/033* (2013.01)

(58) Field of Classification Search
CPC ... G06F 21/52; G06F 21/566; G06F 2221/033
USPC .......................................................... 726/23
See application file for complete search history.

(56) References Cited

U.S. PATENT DOCUMENTS

| 11,416,612 B2 | 8/2022 | Strogov et al. |
| 11,494,491 B2 | 11/2022 | Strogov et al. |
| 2003/0196123 A1* | 10/2003 | Rowland ............ H04L 63/1425 709/224 |
| 2012/0222116 A1* | 8/2012 | Chenette .............. G06F 21/566 726/23 |
| 2013/0198842 A1* | 8/2013 | Klein .................... G06F 21/566 726/23 |
| 2014/0096240 A1* | 4/2014 | Hay ...................... G06F 21/561 726/22 |

(Continued)

OTHER PUBLICATIONS

Miao Wang; Native API Based Windows Anomaly Intrusion Detection Method Using SVM ; IEEE: 2006; pp. 1-6.*

*Primary Examiner* — Monjur Rahim
(74) *Attorney, Agent, or Firm* — ESPE Legal Consultancy FZ-LLC

(57) ABSTRACT

Systems and methods for threat detection and analysis. A method includes monitoring at least one thread associated with at least one user process on a computing device. The method further includes detecting specific-system calls associated with at least one user process at user level. The specific-system calls are analyzed by applying a filter to system calls sequence feature sets associated with the specific-system calls for detecting one or more events of interest. A capture of a full stack trace of at least one user process is requested if the system calls sequence feature set is filtered and at least one event of interest is detected. A first level monitoring is provided to the computing device, which includes processing and analyzing the captured full stack trace by a machine learning (ML) stack trace analyzer to generate a first verdict for threat detection and analysis.

20 Claims, 5 Drawing Sheets

(56) References Cited

U.S. PATENT DOCUMENTS

| | | | |
|---|---|---|---|
| 2015/0074810 A1* | 3/2015 | Saher | H04L 63/1466 |
| | | | 726/23 |
| 2015/0101050 A1* | 4/2015 | Nielson | G06F 21/552 |
| | | | 726/23 |
| 2019/0173908 A1* | 6/2019 | Couturier | H04L 63/1425 |
| 2019/0268357 A1* | 8/2019 | Rostamabadi | G06F 21/56 |
| 2020/0050762 A1* | 2/2020 | Sathyanarayana | G06F 16/14 |
| 2020/0175165 A1* | 6/2020 | Murphy | G06F 21/566 |
| 2021/0014239 A1* | 1/2021 | Kumar | H04L 63/14 |
| 2021/0266339 A1* | 8/2021 | Moshitzky | H04L 63/0254 |
| 2021/0294896 A1* | 9/2021 | Murphy | G06F 21/566 |
| 2024/0220614 A1* | 7/2024 | Strogov | G06F 21/566 |
| 2024/0330434 A1* | 10/2024 | Strogov | G06F 21/566 |

* cited by examiner

SYSTEM AND METHOD FOR THREAT DETECTION BASED ON STACK TRACE AND USER-MODE SENSORS

TECHNICAL FIELD

The present disclosure generally relates to the field of threat detection. In particular, the present disclosure relates to systems and methods for threat detection and analysis using user mode sensors and kernel drivers for threats that use process injection.

BACKGROUND

Malware is a malicious software that is designed to corrupt specific software code in a computer system for the purpose of infiltrating or damaging the computer system. As such, malware can cause abnormal operation of the computer system or even termination of some applications and the operating system. Typically, malware can be detected in the computer system by analyzing the processes running on thereon, where the suspicious processes can be detected and blocked by security systems installed on the computer system.

Typically, collecting system events and stack traces are s used for malware detection. However, a disadvantageous aspect of the typical methods is that the stack traces are collected independently from the set of hooked system events and are not synchronized. As such, the process of analyzing the collected system events and stack traces requires correlation of system events with the captured stack traces, which requires a lot of operational resources. Furthermore, using the aforementioned typical methods, there can be a scenario where the post analysis of the operations may require missing information (for example a stack trace) because the process state was irreversibly changed. Furthermore, one problem of the typical methods is a low detection rate due to the stack trace being collected at the wrong moment and analyzed without the context of system events characterizing the processes of the system. Some systems employ the usage of kernel sensors for the purpose of threat detection and analysis at kernel level. However, using kernel sensors typically provides the system with a limited number of operations for the purpose of threat detection and analysis, which is not desired.

Therefore, there is a need for systems and methods of threat detection using system events and stack traces in a manner that has a very low impact on the resource utilization of the computing system on which the system events and stack traces are being analyzed.

SUMMARY

Embodiments described herein include systems and methods for threat detection and analysis. A method for threat detection and analysis includes monitoring at least one thread of a first user process on a computing system, detecting specific system calls corresponding to the first user process at user level, analyzing the specific system calls by applying a filter to a system calls sequence feature set associated with the specific system calls for detecting one or more events of interest, capturing a full stack trace of the first user process if system calls sequence feature set is filtered and at least one event of interest is detected and providing a first level monitoring to the computing device, wherein the first level monitoring includes processing and analyzing the captured full stack trace by a machine learning (ML) stack trace analyzer of a security application to generate a first verdict for threat detection and analysis.

In an embodiment, a method further includes detecting a start of the at least one user process and injecting, into a process memory of the at least one user process, a secure code to hook the specific system calls at the user level.

In an embodiment, a method further includes capturing a call stack at user level, wherein the call stack is associated with the first user process.

In an embodiment, a method further includes providing a second level monitoring to the computing device, wherein the second level monitoring includes providing the first verdict and the captured call stack to an aggregated ML analyzer to generate a second verdict for threat detection and analysis.

In an embodiment, a method further includes monitoring at least one thread of a second process on the computing system, detecting specific system calls corresponding to the second process at user level and associating detected system calls with the first and the second processes.

In an embodiment, a method further includes a first process as a target process and a second process as a source process.

In an embodiment, a method further includes determining the source process based on associated system calls in response to the first verdict.

In an embodiment, a method further includes analyzing the source process with static and dynamic analyzers for threat detection.

In an embodiment, detecting the start of the at least one user process and injecting into the process memory of the at least one user process the secure code to hook the specific system calls at the user level is performed by a security monitor driver using a user mode sensor or the security application.

In an embodiment, capturing the full stack trace is performed by the security monitor driver.

In an embodiment, capturing the call stack of the user process is performed by the security application operating at the user level.

In an embodiment, a method further includes pre-processing the full stack trace including by: filtering whitelist calls from the full stack trace, and deduplicating whitelist calls.

In an embodiment, a system for threat detection and analysis includes a user mode sensor configured to monitor at least one thread of a first user process on a computing system, and detect specific system calls corresponding to the first user process at user level, a security application configured to analyze the specific system calls by applying a filter to a system calls sequence feature set associated with the specific system calls for detecting one or more events of interest, and request a full stack trace capture of the first process if the system calls sequence feature set is filtered and one or more events of interest are detected, and a security monitor driver configured to capture the requested full stack trace, wherein the security application includes a machine learning (ML) stack trace analyzer configured to provide a first level monitoring to the computing device, wherein the first level monitoring includes processing and analyzing the captured full stack trace and generating a first verdict for threat detection and analysis.

In an embodiment, the security monitor driver or the security application is configured to detect a start of the first user process and inject, using the user mode sensor, into a process memory of the at least one user process, a secure code to hook the specific system calls at the user level.

In an embodiment, the security application is further configured to request a call stack of the first user process captured by the user mode sensor at the user level.

In an embodiment, the security application further comprises an aggregated ML analyzer configured to provide a second level monitoring to the computing system, wherein the second level monitoring includes providing the first verdict and the captured call stack trace to the aggregated ML analyzer and generating a second verdict for threat detection and analysis.

In an embodiment, the user sensor is further configured to monitor at least one thread of a second process on a computing system, and detect specific system calls corresponding to the second process at user level, and the security monitor driver is configured to associate the detected system calls with the first and the second processes.

In an embodiment, the first process is a target process, and the second process is a source process.

In an embodiment, the security application further comprises static and dynamic analyzers configured to analyze the source process.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
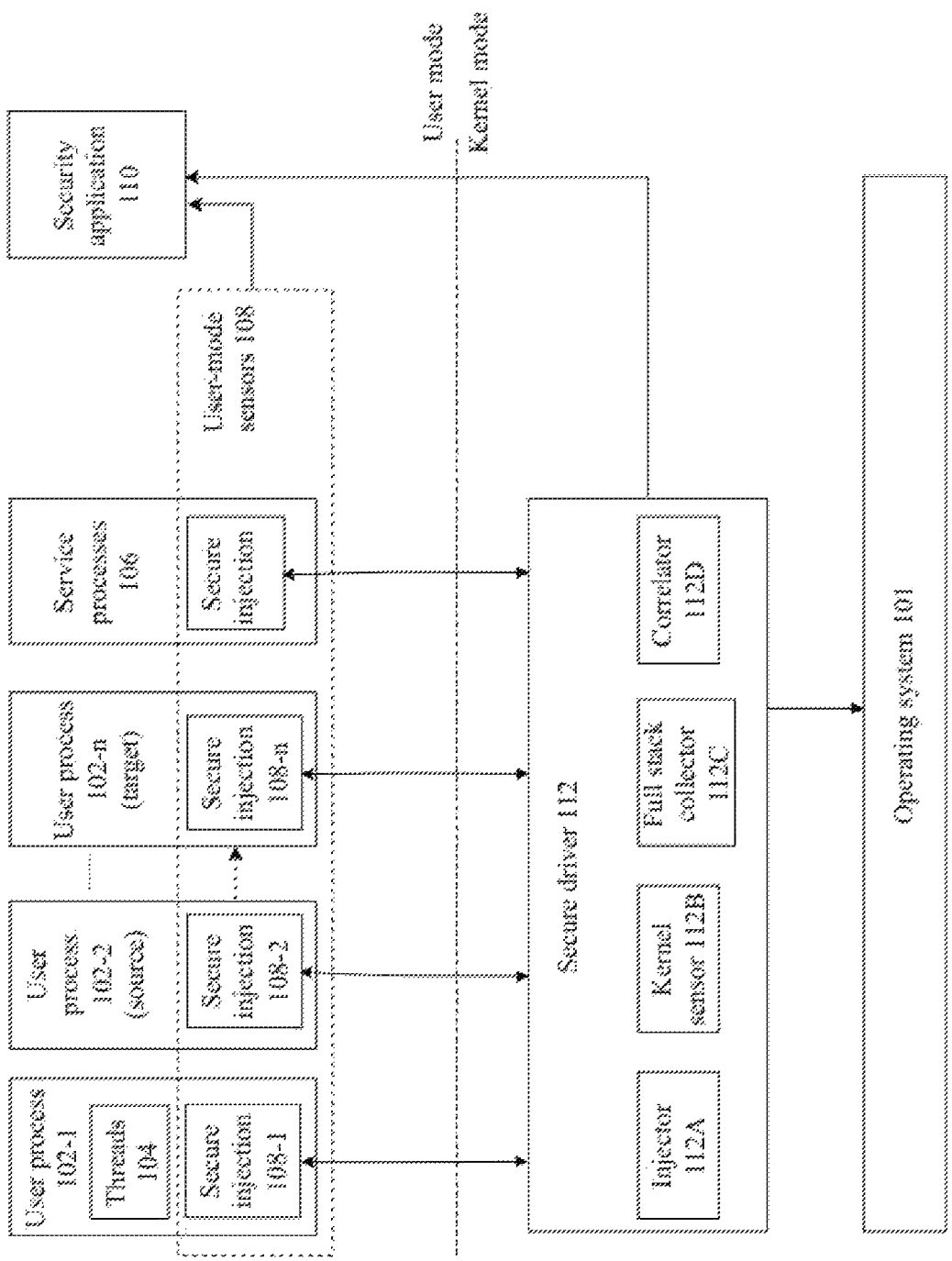
FIG. 1 is a block diagram of a system for threat detection and analysis, in accordance with an embodiment of the present disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Malware detection is typically performed by collecting system events and stack traces. A disadvantageous aspect, however, of the typical methods is that the stack traces are collected independently from the set of hooked system events and are not synchronized. The lack of synchronization means that the computing system is required to deploy system resources first to achieve a synchrony between the hooked system events and the stack traces. Hooked system events are one example of identifiable entry points that can also include imported function calls from other DLLs. Such synchrony can be achieved by the process of analyzing the collected system events and stack traces, which requires filtering of system events and correlation with the captured stack traces. As mentioned previously, these are very resource intensive operations, which may cause the computing system to operate inefficiently. This is not desired.

To this end, the present disclosure describes systems and methods for threat detection and analysis that analyzes system calls and stack traces in a manner that is not resource intensive, thereby contributing to an efficient utilization of system resources and consequently to the efficient operation of the computing system while providing the feature of threat detection and analysis of the detected threat. The present disclosure describes that system events are analyzed for the purpose of threat detection and analysis at user mode as well as at kernel mode using a user mode sensor and a kernel security monitor driver, respectively. An advantageous aspect of performing threat detection and analysis using the kernel security monitor driver and the user mode sensor is that the number of intercepted system events is extended. Moreover, operations intercepted at kernel mode only have multiple causes represented by user mode sensors at user mode level, which provide more context (e.g. the initial call parameters).

In accordance with the present disclosure, the systems and methods provide two different monitoring levels to the computing system, thereby allowing a thorough analysis of the system events for the purpose of threat detection and analysis. Furthermore, the present disclosure includes the usage of machine learning models for the purpose of providing the two different levels of monitoring to the computing system, which serves to increase the efficiency as well as accuracy of the process of monitoring to provide a final verdict of threat detection and analysis with reasonable certainty.

Referring to FIG. 1, a block diagram of a system for threat detection and analysis is depicted, in accordance with an embodiment of the present disclosure. A computing system typically operates in a kernel mode and a user mode. The system 100, in accordance with an embodiment of the present disclosure, is configured to provide monitoring of system events in user mode as well as kernel mode for the purpose of threat detection and analysis. The system 100 includes user processes 102-1, . . . , 102-n running on a computing system having an operating system 101, in accordance with the present disclosure. Each of the user processes 102-1, . . . , 102-n can include one or more threads 104. In accordance with an embodiment of the present disclosure, each user process 102-1, . . . , 102-n includes a secure injection 108-1, . . . 108-n. The secure injections 108-1, . . . 108-n collectively define the user mode sensors 108 and are described further in subsequent sections of the present disclosure. The system 100 also includes service processes 106 running on the computing system. In accordance with an embodiment of the present disclosure, the system 100 is configured to monitor the user processes 102-1, . . . , 102-n and service processes 106. In an embodiment, the monitoring of the user processes 102-1, . . . , 102-n is facilitated by the user mode sensor 108 and a security application 110 operating in user mode along with a security monitor driver 112 operating in kernel mode.

In accordance with one embodiment, the user mode sensor 108 is a subsystem of secure injections 108-1, . . . 108-n, where the secure injections 108-1, . . . 108-n are secure code fed into process memories of the user processes 102-1, . . . , 102-n for capturing user-mode calls or events.

The secure injections 108-1, ... 108-*n* are secure codes that are fed into the memory of the user processes 102-1, ..., 102-*n* as well as the service processes 106 by the security monitor driver 112 or the security application 110. The details of providing the secure injections 108-1, ... 108-*n* to the user process are explained in the subsequent sections of the present disclosure with reference to FIG. 4. In one embodiment, the injection made to process memory changes the sequence of code processing. Thus, the intercepted commands and context from secure injections 108-1, ... 108-*n* is sent to the user mode sensor 108 to be analyzed for checking if the process performs in a suspicious way. In one embodiment, the secure injections 108-1, ... 108-*n* can be implemented as a DLL or directly injected code, such as dynamic or static linking. In yet another embodiment, the secure injections 108-1, ... 108-*n* can be done from another process, from the driver (any) and by injecting the shell code or patching the process file.

Another component of the system 100 operating in the user mode apart from the user mode sensors 108 is the security application 110. The security application 110 is configured to analyze specific system calls by applying a filter to the system calls sequence feature set associated with the specific system calls in order to detect one or more events of interest. More specifically, the security application 110 is configured to analyze the specific system calls that are intercepted by the user mode sensors 108 for the purpose of identifying the event of interest. The event of interest can be any abnormality that indicates the presence of a malware or threat in processes running on the computing system.

On positive detection of an event of interest, the security application 110 is configured to request a full stack trace capture of the process to which the event of interest corresponds. A full stack trace can be captured from user space or kernel space, referred to as full stack. The detection of the event of interest is positive if the system calls sequence feature set is filtered and one or more events of interest are detected by the security application 110. The security application 110 also includes multiple machine learning models for the purpose of providing the different levels of security check for the purpose of threat detection and analysis. The details of the different machine learning models are provided in the subsequent sections of the present disclosure.

Figure 2:
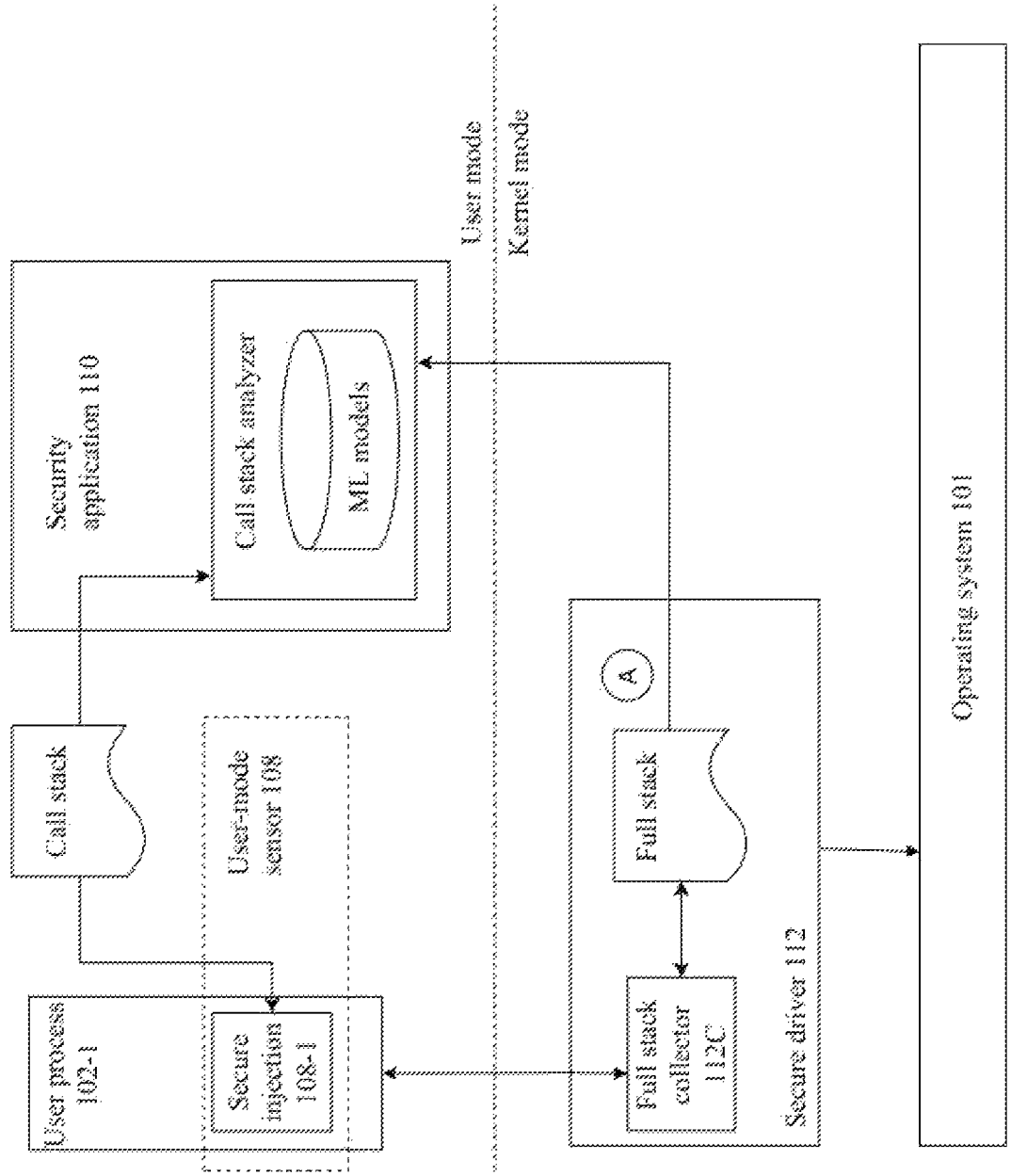
FIG. 2 is a block diagram of a system depicting the operation of the system during full stack capture of a user process.

The system 100 further includes a security monitor driver 112 operating in the kernel mode. The security monitor driver 112 includes an injector 112A, a kernel sensor 112B, a full stack collector 112C, and a correlator 112D. As soon as security application 110 requests the full stack, the full stack collector 112C of the security monitor driver 112 captures the requested full stack trace. The process of full stack capture is shown in FIG. 2. FIG. 2 is a block diagram of the system 100 showing the operation of the system during full stack capture of a user process. The user process in question can be the user process corresponding to which the event of interest has been detected. For example, as illustrated in FIG. 2, the user process 102-1 can be a process whose full stack trace capture is requested by the security application 110 to the security monitor driver 112. The full stack collector 112C captures the required full stack and provides it back to the security application 110. In an embodiment, the security application 110 is further configured to pre-process the captured full stack trace. In an embodiment, pre-processing can include deduplication of calls and/or filtering whitelist calls and modules, like libraries, to produce the convolution of full stack trace for more efficient further analysis.

As mentioned previously, the security application 112 also includes machine learning models for the purpose of providing different levels of security checks to the computing system. The captured full stack is provided to the machine learning stack trace analyzer at the security application 110. The captured full stack is then analyzed at the security application 110 by the machine learning stack trace analyzer to provide a first level monitoring to the computing system. The first level monitoring includes providing a first verdict of threat detection and analysis. It is to be noted that the captured full stack can include information associated with events corresponding to the user process 102-1 occurring in the user mode captured by the user mode sensor 108 as well as the events occurring in the kernel mode captured by the kernel sensor 112B.

After the first level monitoring, the system 100 can also initiate a second level monitoring as well. For the purpose of performing the second level monitoring, a call stack of the user process 102-1 is captured by the security application 110, and the same is provided to a call stack analyzer at the security application 110. The call stack can be captured by the user mode sensors 108 and provided to the security application 110. In one embodiment, the call stack analyzer can be an aggregated machine learning analyzer that is configured to receive the information associated with the first verdict as well as the captured call stack for generating a second verdict for threat detection and analysis. In yet another embodiment, the call stack can be used along with the convolution of the full stack with addition of intercepted system calls if the convolution itself fails to provide sufficient information for generation of the verdict of threat detection and analysis.

In one embodiment, the machine learning threat detection models of the security application 110 can be configured to either generate a verdict of threat analysis based on only the full stack captured by the use of user mode sensors 108.

In another embodiment, if the information in the full stack itself is not sufficient to generate a verdict, the models can be trained to use the convolution of full stack trace with additional intercepted system calls, which lead to full stack trace capturing. Such a convolution facilitates a targeted analysis of the potential source process or processes for generation of a verdict of threat analysis.

One example of malware or an event of interest is ransomware shell code injection with CreateRemoteThread. In one implementation of the malware, the malware opens a target process using OpenProcess. The malware then performs memory allocation using VirtualAllocEx. The malware writes a malicious code into the target process using WriteProcessMemory, and finally calls CreateRemoteThread to execute the injected malicious code. Therefore, for this example, the specific system calls associated with the target process monitored at the user level using the user mode sensor 108 include OpenProcess, Virtual AllocEx, WriteProcessMemory, CreateRemoteThread, and so on.

Another example of malware or an event of interest is shell code injection using QueueUserApc (APC-Asynchronous Procedure Call). In one implementation of the malware, the malware opens a target process using OpenProcess. The malware performs a memory allocation using VirtualAllocEx. The malware writes malicious code into the target process using WriteProcessMemory. The malware calls OpenThread to get access to already running threads of the process. The malware finally uses QueueUserApc to inject APC code, which is actually the malicious injected code in the target process. Therefore, for this example, the specific system calls associated with the target process monitored at the user level using the user mode sensor 108 include OpenProcess, VirtualAllocEx, WriteProcessMemory, QueueUserApc, LoadLibrary, and so on.

Therefore, the present disclosure includes the use of different machine learning models for the purpose of threat detection and analysis. These models are trained respectively on full stack traces, convolution of full stack traces, combination of stack traces of different processes, and/or combination of full stack traces and events of interest. In some embodiments, the usage of machine learning models, in terms of ML model weights can be dynamically changed based on the hooked events, target process, source process, and so on.

Figure 3:
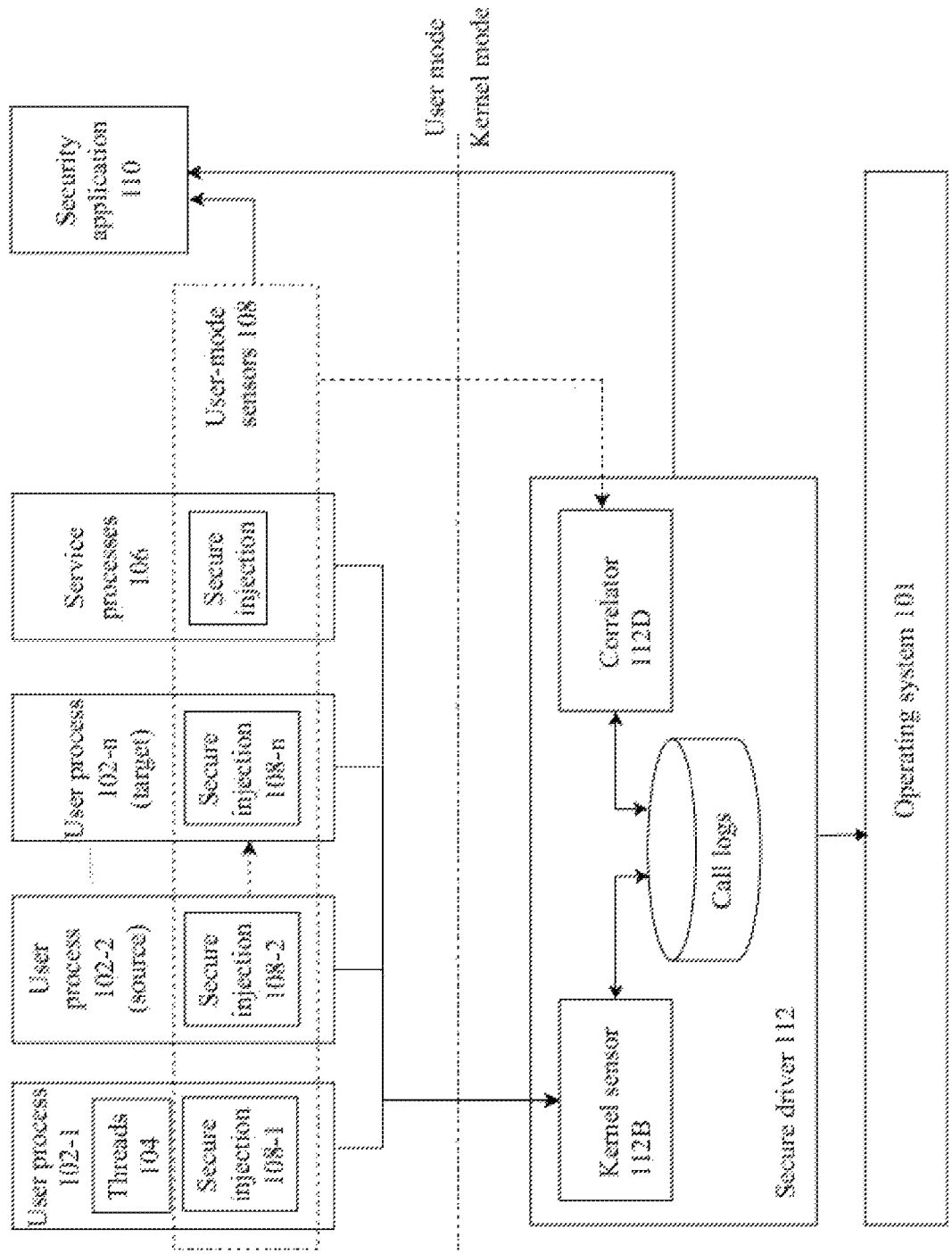
FIG. 3 is a block diagram of system operation for correlation of processes running on a computing system.

The explanation above has been provided with respect to performing threat detection and analysis of one user process. However, the system 100 can also be used to identify inter-process relations for the purpose of identifying a source process where the malware originates, and a target process that is in turn affected by the source process. For that purpose, the system 100 can be configured to analyze all processes that can relate to the source process. To facilitate the analysis of the processes related to the source process, the security monitor driver 112 includes the kernel sensor 112B and the correlator 112D. FIG. 3 is a block diagram of system operation for correlation of the processes running on the computing system.

More specifically, modern malware often uses code injection techniques, exploitation of vulnerabilities or other malicious functions based on inter-process communication. Referring to FIG. 3, in one embodiment, process 102-2 is the source of infection for target process 102-n. For example, process 102-2 injects malicious code or a library into process 102-n. This operation can be performed as a chain of interprocess interactions, including using services 106. There are examples of threats when, using vulnerabilities in a driver or another module of the operating system 101, malicious code is executed on behalf of a service process 106, in which case the service can also be a source of infection in this context. To address such a threat, the user mode sensor is capable to associate hooked or intercepted system calls from different processes and determine the possible source process 102-2 based on the verdict of threat detection in the target process 102-n. In particular, the user mode sensor 108 is communicatively coupled to the correlator 112D. The kernel sensor 112B and the correlator 112D operate in tandem to access call logs of the source process for the purpose of identifying the relationship between the source process and the target process.

Similarly, an embodiment can include monitoring another process and generating a final verdict for threat detection and analysis based on analysis of specific system calls, corresponding full stack traces and additional attributes associated with relation between the first, second, and third processes, and so on for a plurality of processes.

ML models, in particular embodiments, can be built on neural networks, deep learning algorithms, and other models that allow classifying a set of input data, consisting of a full stack trace, convolution of full stack, system calls, events, a first-level verdict, or combinations of these data. The verdict of ML models comprises at least one of a probabilistic value characterizing the relation of input data to one or more classes of malware, part of the call stack characterizing the involvement of input data in one or more classes of malware, calls characterizing the involvement of input data in one or more classes of malware.

In one embodiment, if the target process is classified as malicious based on the first or the second verdict, then the source process that initiated an injection to the target process is analyzed for malicious code. The analysis of the source process is performed using at least one of static and dynamic malware analysis.

In another embodiment, if the target or source processes are classified as malicious, a response action is performed. A response action comprises at least one of terminating the process, freezing the process, killing the process, quarantining the process, determining the file associated with the source process and deleting the file, and determining the network connections associated with the target or source processes and blocking these connections. A response action can also include remediation actions to restore files, registry, and scheduled tasks.

Figure 4:
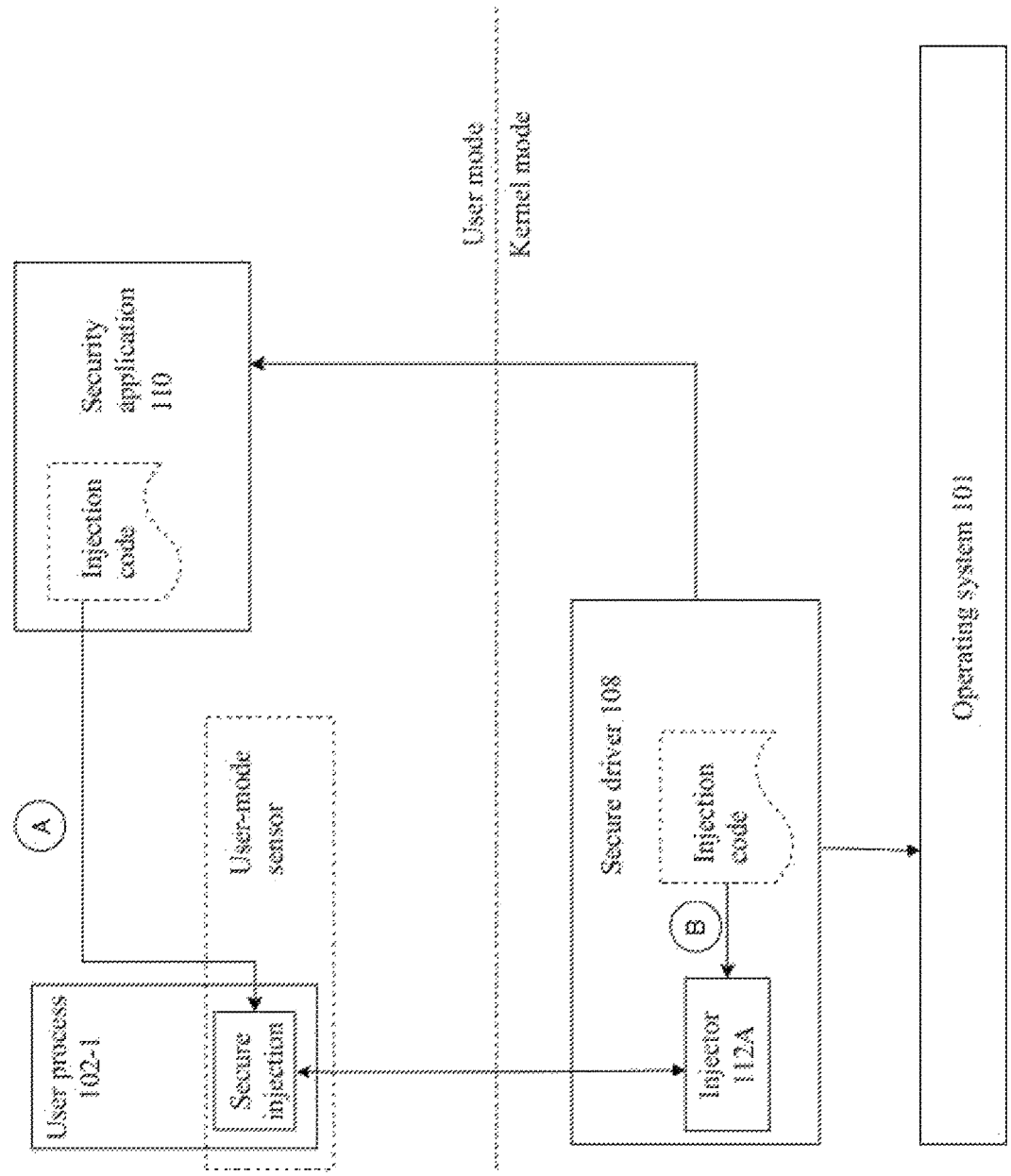
FIG. 4 is a block diagram of a system in operation while performing secure injections into a user process.

Referring again to the process of secure injections 108-1, . . . 108-n, of FIG. 1, and referring further to FIG. 4, a block diagram of the system in operation while performing secure injections into the user process is depicted. The operation of performing secure injections 108-1, . . . 108-n is performed either by the security application 110 or the security monitor driver 112. More specifically, the security monitor driver 112 includes the injector 112A that is configured to detect a start of the first user process and inject, using the user mode sensor, into a process memory of the at least one user process the secure code to hook the specific system calls at the user level. Alternatively, the operation of secure injection can also be performed by the security application 110, as shown in FIG. 4.

An advantageous aspect of the system 100, in accordance with the present disclosure, is that the system 100 facilitates the capture of full stack traces of only those processes that exhibit suspicious behavior. As such, the disadvantageous aspect of the typical methods of malware detection where stack traces are collected independently from the set of hooked system events with any synchrony therebetween is eliminated by the system 100 of the present disclosure. Therefore, the computing system does not have to expend any additional resources in filtering of system events and correlation with the captured stack traces.

Another advantageous aspect of the system 100 is that the usage of the two machine learning models used at the security application 110, namely, the ML stack trace analyzer and the aggregated analyzer provides two different levels of monitoring to the computing system, thereby improving on the accuracy of threat detection and analysis relative to the known systems.

Figure 5:
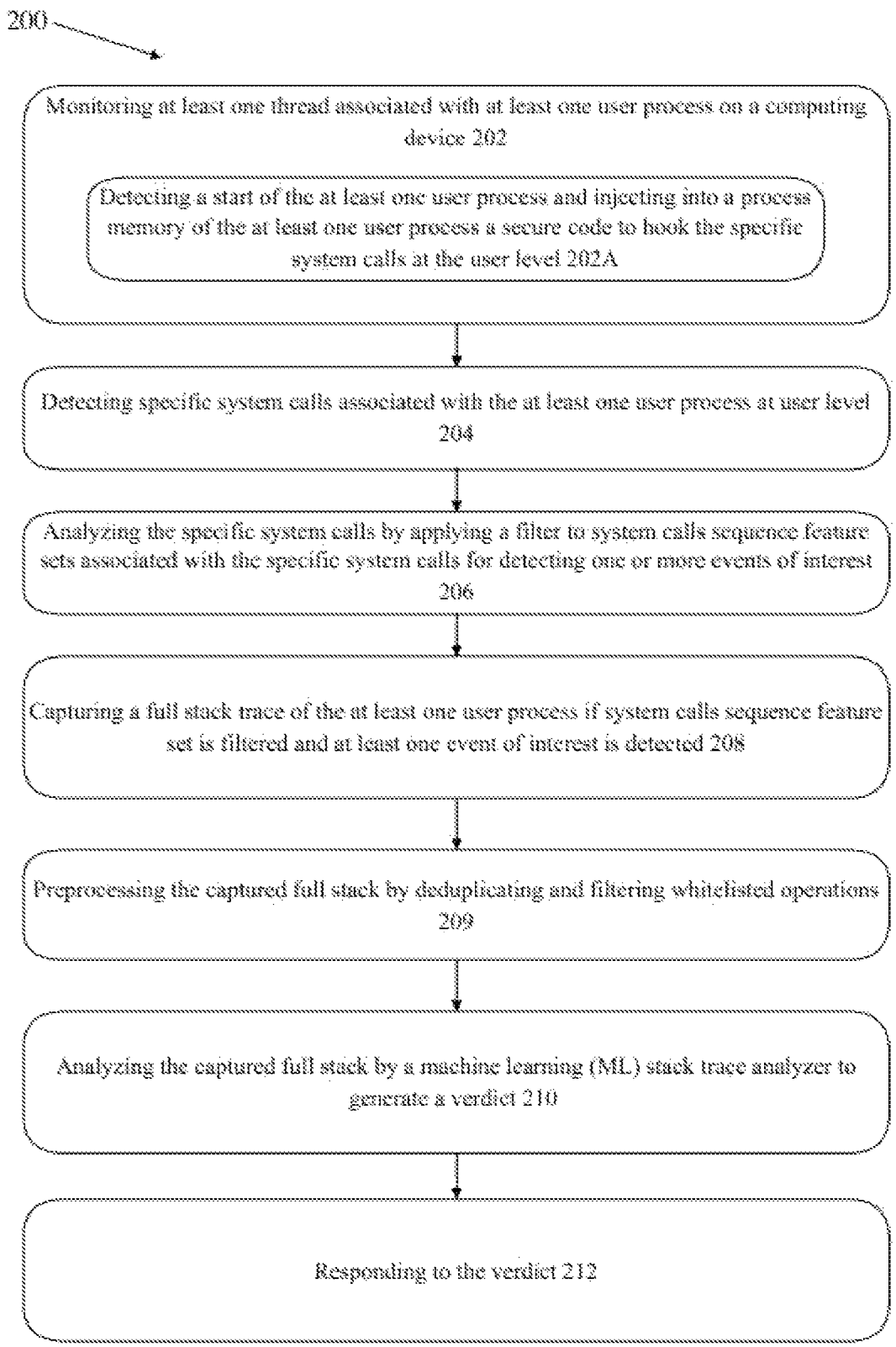
FIG. 5 is a flowchart of a method for threat detection and analysis, in accordance with another embodiment of the present disclosure.

Referring to FIG. 5, a flowchart of a method for threat detection and analysis 200 (hereinafter referred to as method 200) is depicted, in accordance with an embodiment of the present disclosure. The order in which the method 200 is described is not intended to be construed as a limitation, and any number of the described method blocks can be combined in any order to implement the method or similar alternative methods. Additionally, individual blocks can be deleted from the method without departing from the scope of the subject matter described herein. Furthermore, the method can be implemented in any suitable hardware, software, firmware, or combination thereof.

At block 202, the method 200 includes monitoring at least one thread associated with at least one user process on a computing system. In an embodiment, such monitoring is performed by the user mode sensor 108. The user mode sensor 108 operates at the user mode level of the computing system. In an embodiment, monitoring at block 202 further includes, at block 202A, detecting a start of the at least one user process and injecting into a process memory of the at least one user process a secure code to hook the specific system calls at the user level. In an embodiment, detecting the start of the user process and secure injection is performed by the security application 110 or the security monitor driver 112.

At block 204, the method 200 includes detecting specific system calls associated with the at least one user process at the user mode level. In an embodiment, the user mode sensor 108 is configured to detect the specific system calls. In one embodiment, the user mode sensor 108 detects at block 204 specific system calls of the target process. In another embodiment, the user mode sensor 108 detects at block 204 specific system calls of the source process. The block 204 further comprises associating, by the user mode sensor, hooked or intercepted system calls from different processes. The association of the calls is further used to determine the possible source process based on the verdict of threat detection in the target process, wherein target and source processes are monitored by user mode sensor. In an embodiment, the aforementioned association is performed by the correlator 112C of the security monitor driver 112.

At block 206, the method 200 includes analyzing the specific system calls by applying a filter to the system calls sequence feature set associated with the specific system calls for detecting one or more events of interest. In an embodiment, the detection of the one or more events of interest at the user mode is facilitated by the security application 110. As mentioned previously, the event of interest can be any event that indicates abnormal operation thereof, which is indicative of malware presence in the computing system.

At block 208, the method 200 includes requesting a full stack trace capture of at least one user process if the system calls sequence feature set is filtered and the one or more events of interest are detected. In an embodiment, the security application 110 is configured to request the full stack trace capture. In one particular embodiment, the method comprises capturing the full stack trace of the target process.

At block 209, a captured full stack trace is pre-processed. Pre-processing comprises deduplication of calls and/or filtering whitelist calls and modules, like libraries, to produce the convolution of full stack trace for more efficient further analysis. In an embodiment, the aforementioned pre-processing is performed by the security application 110.

At block 210, the method 200 includes providing a first level monitoring to the computing system, which includes processing and analyzing the captured full stack trace by a machine learning (ML) stack trace analyzer to generate a first verdict for threat detection and analysis.

At block 212, the response action to the verdict is performed. In one embodiment, if the target process is classified as malicious based on the first verdict, then the source process that initiated an injection to the target process is analyzed for malicious code. The analysis of the source process is performed using at least one of static and dynamic malware analysis. In another embodiment, if the target or source processes are classified as malicious, the response action is performed. Response action comprises at least one of terminating the process, freezing the process, killing the process, quarantining the process, determining the file associated with the source process and deleting this file, determining the network connections associated with the target or source processes and blocking these connections. Response action also consists of remediation actions with files, registry, scheduled tasks. If the verdict does not allow to determine the harmfulness of the process with a certain accuracy, then the second level of monitoring is applied using the ML aggregated model at the security application 110. The verdict generated by the ML stack trace analyzer can then be provided to another ML aggregated analyzer along with the call stacks of the monitored processes detected by the user mode sensor 108 to provide the second level monitoring to the computing system and to generate a second verdict for threat detection and analysis.

In one embodiment, the method 200 includes monitoring at least one thread associated with a first user process of at least one process. At least one process can be either a user process or a service process.

In accordance with an embodiment, the method 200 further includes monitoring at least one thread associated with a user process. The method further includes detecting specific system calls associated with the first user process and the second user process of the at least one user process. The detected specific system calls associated with the first and the second user processes are analyzed for detecting the one or more events of interest. The method further includes identifying relations of processes, threads, and files corresponding to detected system calls associated with the first and the second user processes of at least one user process. The method further includes providing the first level monitoring to the computing system, which includes processing and analyzing by the ML stack trace analyzer, at the security application 110, the associated system calls with additional attributes corresponding to the identified relation between the first and the second user processes of the at least one user process.

Similarly, an embodiment can include monitoring a third user process and generating the final verdict for threat detection and analysis based on analysis of specific system calls, corresponding full stack traces, call stack traces, and additional attributes associated with relation between the first, second, and third user processes, and so on for a plurality of user processes.

In an embodiment, the second verdict provided by the ML aggregated analyzer at the security application 110 can be the final verdict for threat detection and analysis.

An advantageous aspect of method 200, in accordance with the present disclosure, is that method 200 facilitates the capture of full stack traces of only those processes that exhibit suspicious behavior. As such, the disadvantageous aspect of the typical methods of malware detection where stack traces are collected independently from the set of hooked system events with any synchrony therebetween is eliminated by the method 200 of the present disclosure. Therefore, the computing system does not have to expend any additional resource in filtering of system events and correlation with the captured stack traces.

Another advantageous aspect of the method 200 is that the usage of different machine learning models, namely, the ML stack trace analyzer and the ML aggregated analyzer, which are provided at the security application 110 provides two different levels of monitoring to the computing system, thereby improving on the accuracy of threat detection and analysis relative to the known methods.

The invention claimed is:
1. A method for threat detection, the method comprising:
   training a machine learning (ML) stack trace analyzer based on a plurality of full stack trace data, the training including weighting one or more events associated with the full stack trace data;
   monitoring at least one thread of a first user process on a computing system, including detecting a start of the first user process and injecting, into a process memory of the first user process, a secure code to hook the specific system calls at the user level;

detecting specific system calls corresponding to the first user process at user level;
analyzing the specific system calls by applying a filter to a system calls sequence feature set associated with the specific system calls for detecting one or more events of interest;
capturing a full stack trace of the first user process if system calls sequence feature set is filtered and at least one event of interest is detected;
providing a first level monitoring to the computing device, wherein the first level monitoring includes processing and analyzing the captured full stack trace by the machine learning (ML) stack trace analyzer to generate a first verdict;
capturing a call stack at user level, wherein the call stack is associated with the first user process;
providing a second level monitoring to the computing system, wherein the second level monitoring includes providing the first verdict and the captured call stack to an aggregated ML analyzer to generate a second verdict;
monitoring at least one thread of a second process on the computing system, wherein the first process is a target process and the second process is a source process;
detecting specific system calls corresponding to the second process at user level;
associating detected system calls with the first user and the second processes;
determining the source process based on associated system calls in response to the first verdict;
when the first verdict or the second verdict are classified as malicious, analyzing the source process with static and dynamic analyzers for threat detection; and
responding to the threat detection with a response action on the computing system.

2. The method of claim 1, wherein the detecting the start of the first user process and injecting into the process memory of the first user process the secure code to hook the specific system calls at the user level is performed by a security monitor driver using a user mode sensor or the security application.

3. The method of claim 2, wherein the capturing the full stack trace is performed by the security monitor driver.

4. The method of claim 3, wherein capturing the call stack of the user process is performed by the security application operating at the user level.

5. The method of claim 1, further comprising pre-processing the full stack trace including by: filtering whitelist calls from the full stack trace; and deduplicating whitelist calls.

6. The method of claim 1, wherein the response action comprises at least one of terminating the first user process, freezing the first user process, killing the first user process, quarantining the first user process, determining a file associated with the source process and deleting the file, determining a network connection associated with the target process or the source process and blocking the network connections, restoring one or more files, restoring one or more registry entries, or restoring one or more scheduled tasks.

7. The method of claim 1, further comprising dynamically changing the weighting of the one or more events associated with the full stack trace data based on the one or more events of interest, the target process, or the source process.

8. The method of claim 1, wherein the first verdict comprises at least one of: a probabilistic value characterizing a relation of the full stack trace to one or more classes of malware; at least part of the call stack characterizing involvement of the full stack trace in one or more classes of malware; or calls characterizing the involvement of the full stack trace in one or more classes of malware.

9. The method of claim 1, further comprising: monitoring a third process on the computing system, the third process related to the first process and the second process; and generating a third verdict based on the aggregated ML analyzer, wherein responding to the threat detection with a response action on the computing system is further based on the third verdict.

10. The method of claim 1, wherein the second level monitoring is provided when the first verdict is outside of a certain accuracy.

11. A system for threat detection, the system comprising:
a user mode sensor configured to:
monitor at least one thread of a first user process on a computing system including detecting a start of the first user process and injecting, into a process memory of the at least one user process, a secure code to hook the specific system calls at the user level, and
detect specific system calls corresponding to the first user process at user level, a security application configured to:
analyze the specific system calls by applying a filter to a system calls sequence feature set associated with the specific system calls for detecting one or more events of interest,
request a full stack trace capture of the first process if the system calls sequence feature set is filtered and one or more events of interest are detected, and
request a call stack of the first user process captured by the user mode sensor at the user level; and
a security monitor driver configured to capture the requested full stack trace,
wherein the security application includes a machine learning (ML) stack trace analyzer configured to provide a first level monitoring to the computing device, the ML stack trace analyzer trained based on a plurality of full stack trace data, the training including weighting one or more events associated with the full stack trace data, wherein the first level monitoring includes processing and analyzing the captured full stack trace and generating a first verdict for threat detection,
wherein the security application further comprises an aggregated ML analyzer configured to provide a second level monitoring to the computing system, wherein the second level monitoring includes providing the first verdict and the captured call stack trace to the aggregated ML analyzer and generating a second verdict for threat detection,
wherein the user mode sensor is further configured to monitor at least one thread of a second process on a computing system, and detect specific system calls corresponding to the second process at user level, and the security monitor driver is configured to associate the detected system calls with the first and the second processes, wherein the first process is a target process, and the second process is a source process, and
wherein the security application is further configured to, when the first verdict or the second verdict are classified as malicious, analyze the source process with static and dynamic analyzers for threat detection, and respond to the threat detection with a response action on the computing system.

12. The system of claim 11, wherein the security application operates at the user level to capture the call stack of the first user process.

13. The system of claim 11, wherein the security application is further configured to pre-process the full stack trace including by:
 filtering whitelist calls from the full stack trace; and
 deduplicating whitelist calls.

14. The system of claim 11, wherein the response action comprises at least one of terminating the first user process, freezing the first user process, killing the first user process, quarantining the first user process, determining a file associated with the source process and deleting the file, determining a network connection associated with the target process or the source process and blocking the network connections, restoring one or more files, restoring one or more registry entries, or restoring one or more scheduled tasks.

15. The system of claim 11, wherein the weighting of the one or more events associated with the full stack trace data based on the one or more events of interest, the target process, or the source process is dynamically changed.

16. The system of claim 11, wherein the first verdict comprises at least one of:
 a probabilistic value characterizing a relation of the full stack trace to one or more classes of malware;
 at least part of the call stack characterizing involvement of the full stack trace in one or more classes of malware; or
 calls characterizing the involvement of the full stack trace in one or more classes of malware.

17. The system of claim 11, wherein the user mode sensor is further configured to monitor a third process on the computing system, the third process related to the first process and the second process,
 wherein the security application is further configured to generate a third verdict based on the aggregated ML analyzer, and
 wherein responding to the threat detection with a response action on the computing system is further based on the third verdict.

18. The system of claim 11, wherein the second level monitoring is provided when the first verdict is outside of a certain accuracy.

19. The system of claim 11, wherein the security monitor driver is configured to capture only a subset of all full stack traces on the computing system.

20. The system of claim 11, wherein the ML stack trace analyzer and the aggregated ML analyzer are trained on different training data.

* * * * *